United States Patent [19]

Preusker

[11] Patent Number: 5,323,827
[45] Date of Patent: Jun. 28, 1994

[54] ANTISKID DEVICE FOR VEHICLE WHEELS

[75] Inventor: Werner Preusker, Sauldorf, Fed. Rep. of Germany

[73] Assignee: Confon AG, Rheineck, Switzerland

[21] Appl. No.: 5,000

[22] Filed: Jan. 15, 1993

[30] Foreign Application Priority Data

Feb. 4, 1992 [DE] Fed. Rep. of Germany ....... 4203078

[51] Int. Cl.⁵ .............................................. B60C 27/20
[52] U.S. Cl. .................................... 152/233; 152/216; 152/236
[58] Field of Search ............... 152/208, 213 R, 213 A, 152/214, 216, 233, 236, 241; 301/38.2, 41.1, 41.2, 43

[56] References Cited

U.S. PATENT DOCUMENTS

| | | | |
|---|---|---|---|
| 4,388,754 | 6/1983 | Ilon | 152/213 R X |
| 4,716,949 | 1/1988 | Lee | 152/216 |
| 4,834,158 | 5/1989 | Katz | 152/213 R |
| 4,854,359 | 8/1989 | Ippen et al. | 152/216 |

FOREIGN PATENT DOCUMENTS 0189505 8/1986 European Pat. Off.
1520579 12/1968 France.

*Primary Examiner*—Michael W. Ball
*Assistant Examiner*—Francis J. Lorin
*Attorney, Agent, or Firm*—Herbert Dubno

[57] ABSTRACT

The invention relates to an antiskid device for vehicle wheels, having a retaining device which is coaxially attached on one side of the wheel rim or the wheel disc and which via arms disposed transversely of the running direction and engaging over the wheel running surface retaining an antiskid means bearing against the wheel running surface, the antiskid means being retained on both the side remote from the retaining device and also on the side adjacent thereto in an opening of the arm and being laterally movable in the zone of the tire base, while on the side remote from the retaining device the opening of the arm is a longitudinal opening which is disposed transversely of the running direction and in which the antiskid means attaching end located in the longitudinal opening is located transversely displaceably in relation to the running direction.

4 Claims, 1 Drawing Sheet

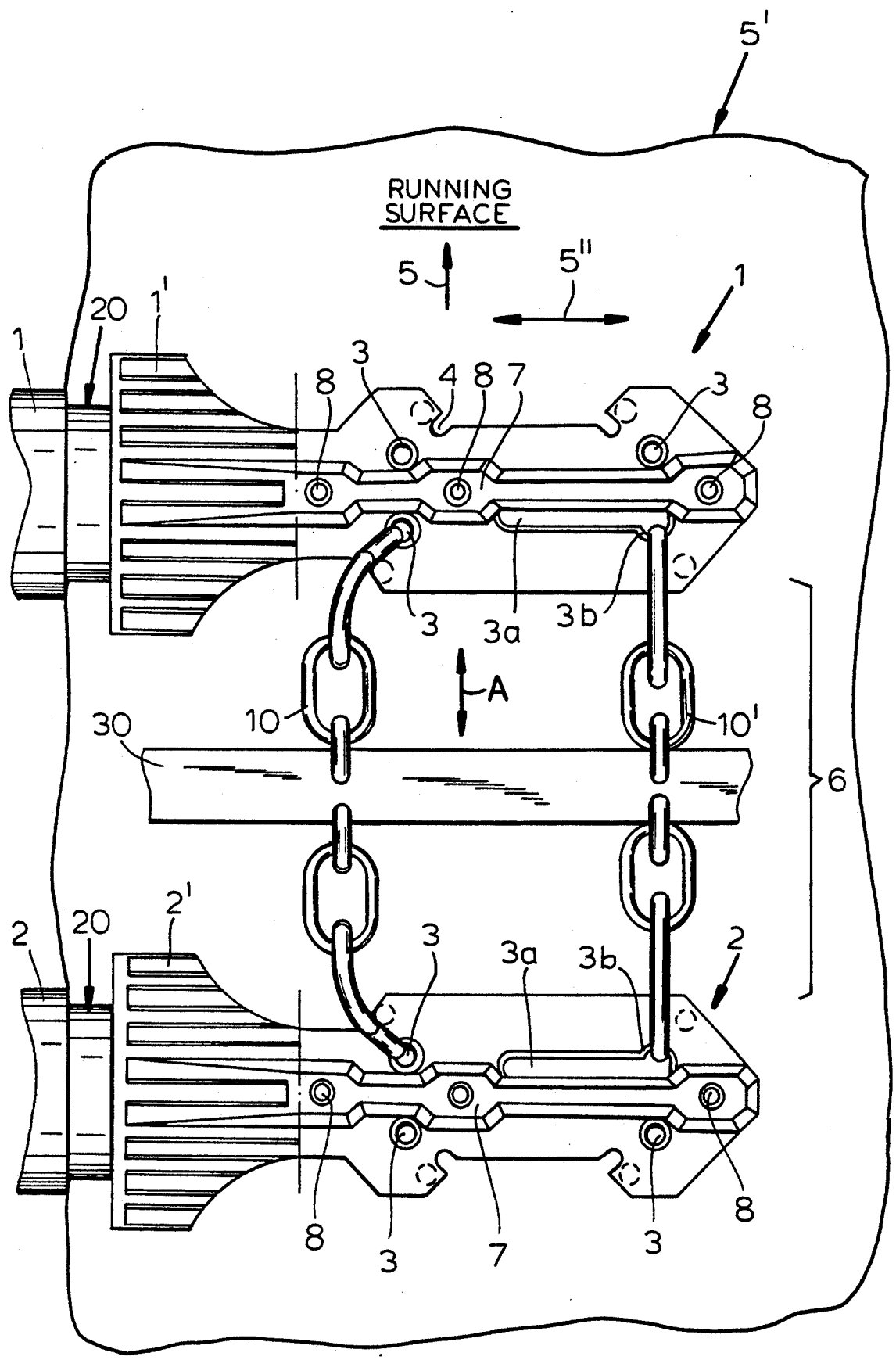

ANTISKID DEVICE FOR VEHICLE WHEELS

FIELD OF THE INVENTION

The invention relates to an antiskid device for vehicle wheels, having a retaining device which is coaxially attached on one side of the wheel rim or the wheel disc and which, via arms disposed transversely of the running direction and engaging over the wheel running surface, retains an antiskid chain bearing against the wheel running surface and mounted on both the side remote from the retaining device and also on the side adjacent thereto in an opening of the arm and laterally movable in the zone of the tire base.

BACKGROUND OF THE INVENTION

An antiskid device is mounted by slipping from the side on to a wheel of a stationary motor vehicle upon mounting. However, the antiskid device cannot be introduced under the tire base without lifting or moving the wheel. After assembly, therefore, a zone of the antiskid means is located alongside the wheel base—i.e., this zone of the antiskid device must be able to yield are enough laterally during assembly. The zone is then displaced automatically on to the wheel running surface only after assembly when the motor vehicle is started.

It has been found that with prior art antiskid device constructions, the antiskid device cannot yield readily enough in the zone of the tire base, so that unskilled personnel mounting the antiskid device often have assembly difficulties.

OBJECTS OF THE INVENTION

It is therefore an object of the present invention to provide an antiskid device having a reliable and improved structure compared to previously known structures.

Still another object of the invention is to provide the antiskid device having an antiskid chain easily yieldable in a direction transverse to a running direction of the wheel and engaging the running surface of an automobile wheel.

It is an object of the invention so to improve an antiskid device of the kind specified that it is simply constructed and the zone of the antiskid device provided for the tire base yields readily.

SUMMARY OF THE INVENTION

All of the objects are achieved according to the structure of the invention including a plurality of arms mounted on a retaining device and extending transversely to a direction of rotation of the wheel to engage the running surface of the latter. At least two successive arms are formed with respective longitudinal openings provided in respective webs of the arms and spaced inwardly from respective longitudinal sides of the latter. At least one antiskid chain bridging the successive arms is attached to the openings by respective opposite ends and is therefore capable of displacing transversely to the direction of rotation in the openings.

Due to the longitudinal holes, such an antiskid device enables the zone thereof provided for the base to readily yield or be displaced, so that the person mounting the antiskid device can slide the device readily on to the wheel from the side without impeding by the lowest part of the device. Moreover, the zone of the antiskid device still located alongside the wheel running surface readily moves on to the running surface.

For a simple and reliably operating construction, according to the invention the antiskid chains attaching end is a hook-shaped chain link. Particularly advantageously with an otherwise substantially constant width, the longitudinal opening has a widened portion at the end remote from the retaining device. As a result, the attaching end, more particularly the hook-shaped chain link, located in the longitudinal opening can slide into the widened portion and is retained reliably, i.e. latching in at that place thereby preventing the chainlink from sliding back.

Particularly advantageously the antiskid chain has plastic webs, located closest to one arm and divided into two in the running direction. Also advantageously according to the invention only two arms, which are adjacent to one another, are formed with longitudinal opening. Each longitudinal opening is disposed on that side of the arm which is adjacent to the adjoining arm.

BRIEF DESCRIPTION OF THE DRAWING

The above and other objects, features and advantages will become more readily apparent from the following description, references being made to the following drawing, in which:

FIG. 1 is a plan view of two arms 1, 2 which are disposed at a distance A and which bear against a wheel running surface 5' on both sides of the base of a motor vehicle wheel. The drawing shows the distance A smaller than it really is.

SPECIFIC DESCRIPTION

An retaining device has three, four or more arms which are pivotably articulated at equal angular distances to a lateral disc (not shown) which is coaxial with the wheel and mounted rotatably and displaceably on the outside of the wheel.

Disposed between each pair of arms 1, 2 is an antiskid chain consisting of chain links and interposed plastic webs and/or plates. The antiskid chain has at its end adjacent the arms hook-shaped chain links which are attached in openings 3. To facilitate the hooking-in of the hook-shaped chain links 10, disposed adjacent each opening 3 is a slot 4 which is worked into the edge of the plate-shaped arm and is disposed, viewed laterally, offset in relation to the opening 3 in the running direction 5 of the wheel.

The arms 1, 2 bounding intermediate space 6, in which the base or running surface 5' of the motor vehicle wheel is located, have to ensure that the antiskid chain can yield laterally, so that the intermediate space 6 is also called a "yielding opening". On the side of each arm 1, 2 adjacent the yielding opening 6 the opening 3 remote from the retaining device 20 takes the form of a longitudinal opening 3a which is disposed transversely of the running direction 5 and in which the antiskid chains attaching end, more particularly the hook-shaped chain link, located in the longitudinal opening 3a can be displaced transversely in the direction 5 of the running direction. As a result, the antiskid chain can readily move in the zone of the intermediate space 6 to the outside of the wheel, so that during assembly the antiskid device can readily yield in the zone of the intermediate space 6.

At the end remote from the retaining device the longitudinal opening 3a has a widened portion 3b which is directed towards the intermediate space 6 and into which the attaching end of the chain can slide as soon as the motor vehicle starts. The antiskid chain is therefore reliably retained in the widened portion 3b, so that it cannot escape back.

As is shown in the drawing, each arm 1, 2 has rib-shaped projections 7 and spikes 8 to improve the hold on the road.

To improve the displaceability of the attaching end or hook-shaped chain link in the longitudinal opening 3a, the plastics webs 30 or plates of the antiskid chain, which are disposed adjacent the arm 1 and the arm 2 in the intermediate space 6, are divided into two, so that a first web or plate part, which is remote from the retaining device, can move in relation to the second web or plate part and therefore does not impede the antiskid means from yielding laterally.

I claim:

1. An antiskid device for a vehicle wheel having a running surface, comprising:

retaining means for mounting coaxially with the wheel from one side thereof and rotatable therewith about an axis of the wheel in a direction of rotation of the wheel;

a plurality of arms on said retaining means, the plurality of arms being spaced radially from the axis and adapted to extend over the running surface and transversely to said direction of rotation, at least one pair of adjacent arms defining a yielding zone of the running surface therebetween, each arm of the pair being provided with:

outer and inner ends, the outer end being operatively connected with said retaining means, a pair of longitudinal sides between the outer and inner ends, an elongated recess spaced inwardly from the sides and extending transversely to said direction between the respective inner and outer ends and terminating at a distance from a respective outer end, and a plurality of retaining openings formed along the respective sides of the arm; and a plurality of connected chain links bearing against said running surface and operatively connected with the plurality of the retaining openings, at least one of said chain links bridging the yielding zone and having link portions mounted displaceably transversely to said direction in at least one of the respective elongated recesses of adjacent arms.

2. The device defined in claim 1 wherein the recess comprises:

a widening portion widening toward one of the respective sides and adjacent the inner end, and an elongated portion of substantially constant width extending from the winding portion toward the outer end, the link portions of the chain bridging the yielding zone being locked in the respective widening portions of the recesses of the adjacent arms.

3. The antiskid device defined in claim 1 wherein said link portions of said one chain link bridging said zone are hooked or closed chain links.

4. The antiskid device defined in claim 1 wherein said elongated recesses are formed along respective sides of the adjacent arms facing one another.

* * * * *